J. H. FENNESSY.
STEERING GEAR COUPLING.
APPLICATION FILED JULY 9, 1917.

1,264,042.

Patented Apr. 23, 1918.

WITNESSES
W. Mac Duvall.
D. B. Phillips.

INVENTOR
J. H. Fennessy,
BY Victor J. Evans
ATTORNEY

UNITED STATES PATENT OFFICE.

JAMES H. FENNESSY, OF ANDERSON, INDIANA, ASSIGNOR OF ONE-HALF TO R. C. ELLISON, OF ANDERSON, INDIANA.

STEERING-GEAR COUPLING.

1,264,042.  Specification of Letters Patent.  Patented Apr. 23, 1918.

Application filed July 9, 1917.  Serial No. 179,465.

*To all whom it may concern:*

Be it known that I, JAMES H. FENNESSY, a citizen of the United States, residing at Anderson, in the county of Madison and State of Indiana, have invented new and useful Improvements in Steering-Gear Couplings, of which the following is a specification.

This invention relates to improvements in devices for preventing the unauthorized operation of vehicles, and has particular reference to a steering gear coupling.

The principal purpose of the invention is to furnish a simple and efficient coupling device applicable to the steering rod of an automobile, bicycle, or similarly controlled vehicle, whereby the steering gear may readily be rendered inoperative when desired.

Another object is to provide a detachable locking element for the device which may be removed and carried by the operator.

For purposes of illustration, I have described in the specification below and shown in the drawings a preferred form of the invention as applied to an automobile steering gear.

In the drawings:—

Figure 1:
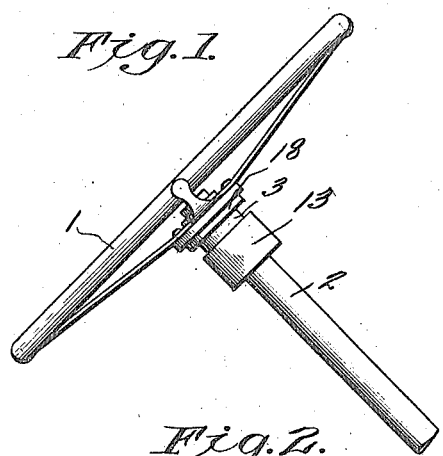
Figure 1 represents a fragmentary perspective view of a steering wheel and rod constructed in accordance with the present invention.
Figure 3:
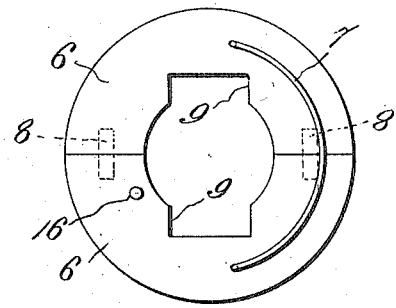
Fig. 3 shows the lock ring in detail.
Figure 2:
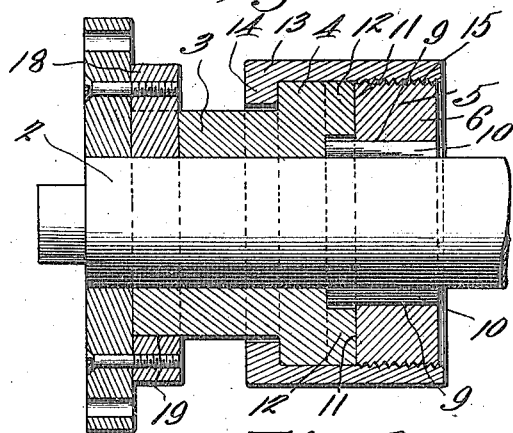
Fig. 2 is a longitudinal section.
Figure 4:
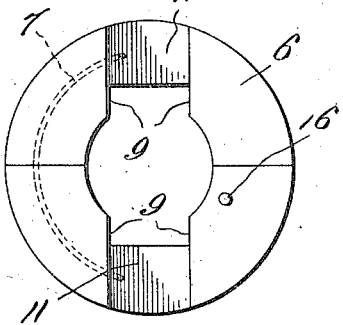
Fig. 4 is a plan view of the locking ring showing the side opposite from that shown in Fig. 3.
Figure 6:
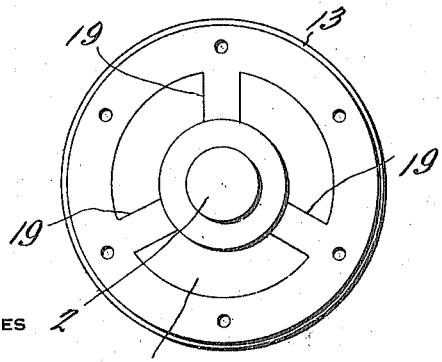
Fig. 6 is an end elevation.
Figure 5:
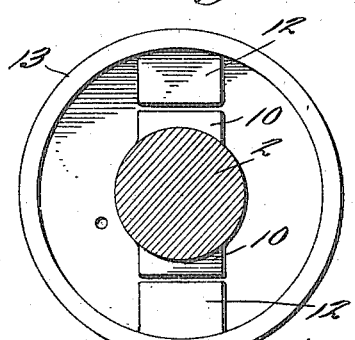
Fig. 5 is a transverse sectional view taken through the coupling and shaft.

Having more detailed reference to the drawings, a steering wheel 1 is shown as arranged for operation of the usual steering rod 2. In accordance with the invention, the wheel 1 is properly secured to one end of a collar 3 loosely mounted on the shaft for free rotation, and provided at the other end with a peripheral flange 4. In the present instance the wheel is connected to the collar 3 by an annular element 18 snugly fitting the collar 3 and having inward projections engaged in channels 19 in the end of the collar, and secured to the wheel and collar by suitable means shown as screws. Positioned on the shaft in face to face contact with the flanged end of the collar 3 is a locking ring 5 consisting of an externally threaded annulus constructed for ready removal from the shaft 2 of two segmental portions 6 connected by a spring 7, and provided with suitable register pins 8 to insure correct alinement of the threads.

Each segment 6 is formed inwardly with a channel 9 for receiving a suitable projection 10 provided on the shaft 2; and on one face with a channel 11 for receiving a projection 12 on the adjacent end of the collar 3, whereby relative rotation of the wheel and shaft will be prevented in the engaged position of the locking ring 5. To detachably retain the ring in such position, a sleeve 13 is loosely mounted on the collar 3, and has at one end an internal flange 14 adapted to engage against the flange 4, and is formed interiorly toward the other end with screw threads 15 for engaging with the screw threads on the locking ring.

In practice, upon leaving the car, the locking ring 5 is released by a few turns of the sleeve 13, and may be removed from the shaft and carried by the operator, thereby rendering the steering gear inoperative. To prevent the substitution of another locking ring by an unauthorized person, a pin 16 is provided on the ring 5 for engaging in a recess 17 in the collar 3; and in manufacturing the device, the position of the pin and recess is varied in different couplings.

It will be evident that the invention is not restricted in application to automobiles, nor even to vehicles in general, and that it may be constructed in a variety of forms; and the right is reserved to such changes, alterations, and modifications as fall within the spirit of the invention and the scope of the claims.

What is claimed is:

1. In a coupling, a shaft, a collar rotatably mounted on the shaft, a divided annulus detachably mounted on the shaft in face to face contact with one end of the collar, and a sleeve having engagement with the collar and adapted for detachable engagement with the annulus whereby the annulus may be maintained in engagement with the shaft and collar to prevent relative rotation of said shaft and collar.

2. In a coupling, a shaft, a collar rotatably mounted on the shaft, an annulus comprising separable segments detachably mounted on the shaft in face to face contact with one end of the collar, and a sleeve overlying and engaged with the collar and annulus whereby separation of the segments of the annulus is prevented and the annulus is maintained in engagement with the shaft and collar to prevent relative movement of said shaft and collar.

3. In a coupling, a shaft, a collar rotatably mounted on the shaft, an annulus comprising a pair of relatively movable segments detachably mounted on the shaft in face to face contact with one end of the collar, and a sleeve overlying and engaged with the collar and detachably engaged with the annulus, whereby means on the annulus are maintained in engagement with means on said shaft and collar to prevent relative rotation of the shaft and collar.

4. In a coupling, a shaft, a flanged collar rotatably mounted on the shaft, an annulus on the shaft in face to face contact with one end of the collar, and a sleeve overlying the collar and annulus and having flanged engagement with the collar and screw threaded engagement with the annulus; said annulus comprising a pair of segments connected by spring means whereby the annulus may be removed from the shaft when disengaged from the sleeve; said elements formed with means adapted to be retained in engagement with means on the shaft and collar and prevent relative rotation of the shaft and collar when the annulus is engaged with the sleeve.

5. In a steering gear coupling, a shaft, a collar coaxially disposed to the shaft, a locking element detachably mounted on the shaft and adapted for engagement with the shaft and the collar to prevent relative rotation of the shaft and collar, and means for retaining said locking element in such engagement; said collar having a portion adapted for coöperating with a portion of the locking element to prevent the use of a locking element not intended for the particular coupling.

In testimony whereof I affix my signature.

JAMES H. FENNESSY.

Copies of this patent may be obtained for five cents each, by addressing the "Commissioner of Patents, Washington, D. C."